US008755344B2

(12) United States Patent
Bekiares et al.

(10) Patent No.: US 8,755,344 B2
(45) Date of Patent: Jun. 17, 2014

(54) METHOD AND APPARATUS FOR GRANTING WIRELESS CONNECTION RESOURCES TO A WIRELESS COMMUNICATIONS DEVICE WITHIN A COMMUNICATION SYSTEM

(75) Inventors: Tyrone D. Bekiares, Chicago, IL (US); Trent J. Miller, West Chicago, IL (US); Aparna Pandey, Chicago, IL (US); Steven D. Tine, Buffalo Grove, IL (US)

(73) Assignee: Motorola Solutions, Inc., Schaumburg (IL)

( * ) Notice: Subject to any disclaimer, the term of this patent is extended or adjusted under 35 U.S.C. 154(b) by 109 days.

(21) Appl. No.: 13/330,954

(22) Filed: Dec. 20, 2011

(65) Prior Publication Data
US 2013/0155966 A1 Jun. 20, 2013

(51) Int. Cl.
*H04W 4/00* (2009.01)
*H04W 72/08* (2009.01)

(52) U.S. Cl.
CPC .................................... *H04W 72/08* (2013.01)
USPC ............................ 370/329; 370/437; 455/450

(58) Field of Classification Search
USPC ......... 370/329, 328, 332, 431, 437, 465, 468; 455/450, 452.1, 452.2, 454, 464
See application file for complete search history.

(56) References Cited

U.S. PATENT DOCUMENTS

| | | | | |
|---|---|---|---|---|
| 8,325,605 B1* | 12/2012 | Pankajakshan et al. | ...... | 370/231 |
| 8,346,273 B2* | 1/2013 | Weigand | ..................... | 455/452.1 |
| 2002/0119783 A1* | 8/2002 | Bourlas et al. | ................ | 455/453 |
| 2003/0078050 A1* | 4/2003 | Carlborg et al. | .............. | 455/452 |
| 2003/0112784 A1* | 6/2003 | Lohtia et al. | ................... | 370/342 |
| 2005/0113106 A1* | 5/2005 | Duan et al. | .................. | 455/452.2 |
| 2005/0171984 A1* | 8/2005 | Wang et al. | ................... | 708/100 |
| 2007/0072593 A1* | 3/2007 | Huliyapur Math | ........... | 455/415 |
| 2007/0209865 A1* | 9/2007 | Kokosalakis et al. | ............. | 181/5 |
| 2008/0107221 A1* | 5/2008 | Yamanaka et al. | ............. | 375/371 |
| 2008/0214220 A1* | 9/2008 | Beziot et al. | .................. | 455/512 |
| 2009/0016229 A1* | 1/2009 | Wu et al. | ..................... | 370/252 |
| 2009/0081962 A1* | 3/2009 | Sohrabi | .......................... | 455/79 |
| 2010/0195521 A1* | 8/2010 | Wanstedt et al. | ............. | 370/252 |

OTHER PUBLICATIONS

PCT International Search Report Dated March 27, 2013 for Counterpart Application PCT/US2012/069116.
"3rd Generation Partnership Project; Technical Specification Group Radio Access Network; Utran IU Interface Radio Access Network Application Part (RANAP) Signalling (Release 10)"; 3GPP Standard;3GPP TS 25.413, 3rd Generation Partnership Project (3GPP), Mobile Competence Centre; France; vol. RAN WG3, No. V10.4.0, Dec. 19, 2011, p. 1-427, XP050554650.

* cited by examiner

*Primary Examiner* — Paul H. Masur
*Assistant Examiner* — Michael Phillips
(74) *Attorney, Agent, or Firm* — Kenneth A. Haas

(57) ABSTRACT

A method and apparatus for granting wireless connection resources for a UE within a communication system is provided herein. During operation, an application requests allocation of wireless communication resources (a bearer reservation) to sustain transmission at a specified bit rate across the communication system via an admission control function. In response to the bearer reservation request, an admission control function calculates a wireless connection efficiency as a function of the requested bit rate and an amount of shared wireless connection resources required to sustain the requested bit rate given the current wireless connection quality associated with the UE. The wireless connection efficiency is then utilized to determine whether or not to admit the bearer reservation request.

18 Claims, 3 Drawing Sheets

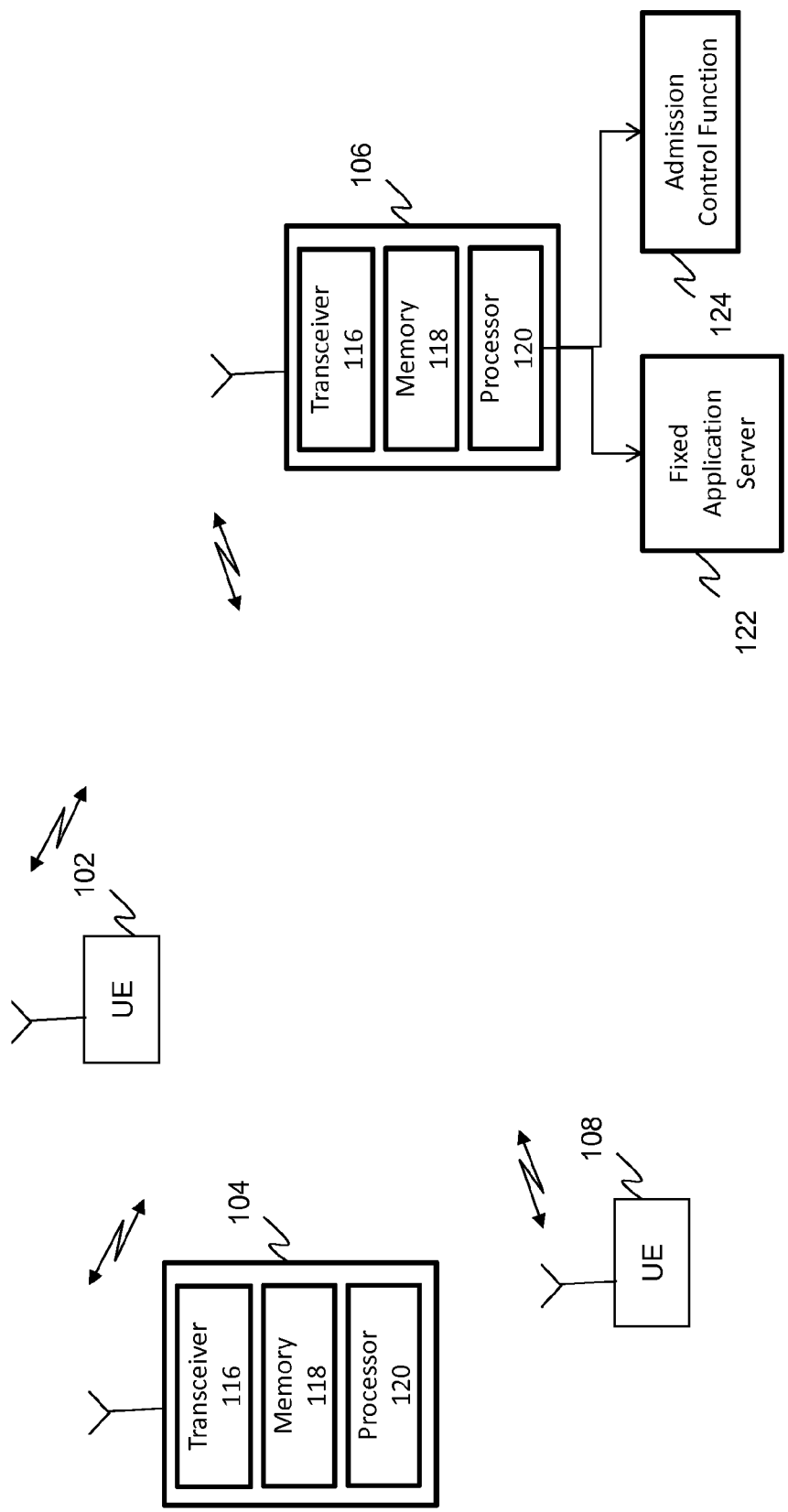

METHOD AND APPARATUS FOR GRANTING WIRELESS CONNECTION RESOURCES TO A WIRELESS COMMUNICATIONS DEVICE WITHIN A COMMUNICATION SYSTEM

FIELD OF THE INVENTION

The present invention generally relates to admitting a request for allocation of wireless connection resources, and more particularly to a method and apparatus for admitting a request for allocation of wireless connection resources in a communication system.

BACKGROUND OF THE INVENTION

Modern wireless networks employ agile modulation and forward error correction (FEC) techniques. As such, the amount of wireless connection resources (e.g., over-the-air resource blocks) required to sustain transmission of a data stream at a given bit rate (i.e., throughput) to or from a wireless communication device depends on the associated wireless connection quality (e.g., the signal-to-noise Ratio (SNR)) between the wireless communication device, herein known as user equipment (UE), and an infrastructure communication device, herein known as a base station (BS). When a UE is subject to interference, its associated wireless connection quality will deteriorate. To compensate for that deterioration, the transmitting entity (UE or BS, respectively) will select a lower complexity modulation and/or apply additional FEC in order to sustain transmission at a given bit rate.

Although these mitigation techniques can potentially provide a UE associated with a relatively poor wireless connection quality with a higher sustained bit rate, they also require a significantly larger amount of wireless connection resources to be allocated with respect to a UE associated with a relatively good wireless connection quality. In one example, a UE transmitting a 128 kb/s data stream and subject to wireless interference (e.g., when located between neighboring cells in a cellular system) will consume 11 times the amount of wireless connection resources with respect to a UE associated with a relatively good wireless connection quality also transmitting a 128 kb/s data stream.

Modern wireless networks are architected in such a way that all UEs connected to the same point-of-attachment (e.g., a BS sector) draw from the same pool of available wireless connection resources. Following the example above, a given point-of-attachment may be able to simultaneously support 11 UEs associated with a relatively good wireless connection quality, each transmitting a 128 kb/s video stream, or 1 UE associated with a relatively poor wireless connection quality transmitting a 128 kb/s video stream.

Modern wireless networks provide a means of unfairly sharing available wireless connection resources via bearer reservations. As used herein, a bearer reservation is an allocation of sufficient wireless connection resources to sustain transmission of a data stream at a requested bit rate across a communication network. Notably, bearer reservations are typically requested in units of bits/second, irrespective of the amount of wireless connection resources required to actually sustain the requested bit rate. When an application running on a UE or an application running on an application server requests a bearer reservation, the admission control function interfaces with the BS serving the identified UE to determine if sufficient wireless connection resources exist to sustain the requested bit rate. If sufficient wireless connection resources exist, the bearer reservation request is admitted. If sufficient wireless connection resources do not exist and priority preemption is not applicable, the bearer reservation request is rejected.

When operating on modern wireless networks, applications interface with an admission control function to request bearer reservations. Applications may associate an admission priority and bearer retention policy, commonly referred to as Allocation, Retention, and Priority (ARP), with a bearer reservation request. Accordingly, each request for a bearer reservation can be associated with an admission priority such that the communication system may preempt an existing bearer reservation in favor of admitting a requested bearer reservation of a higher priority. Bearer reservation requests associated with the same priority typically compete for wireless connection resources on a first come, first serve basis. In other words, the first bearer reservation to be admitted at a particular point-of-attachment may block admittance of subsequent bearer reservations having the same priority and targeting the same point-of-attachment. Referring again to our example, if a bearer reservation for a 128 kb/s data stream associated with a given priority and identifying a UE associated with a relatively poor wireless connection quality is admitted, the bearer reservation would consume the balance of available wireless connection resources for a given point-of-attachment. This, in turn, would block admittance of all subsequent requests for bearer reservations (e.g., 11 other UEs associated with a relatively good wireless connection quality attempting to allocate 128 kb/s data streams) at the same point-of-attachment and associated with the same priority.

It is believed that such behavior may be undesirable for private (e.g., public safety and enterprise) and public (e.g., cellular carrier) network operators. In the case of public safety, an agency may wish to invoke a policy which prevents an officer inadvertently parked at a location inflicting a relatively poor wireless connection quality from conducting routine (non-emergency) video surveillance, at the expense of 11 other officers operating in locations associated with a relatively good wireless connection quality also wanting to conduct routine video surveillance. In the case of public networks, a carrier may wish to invoke a policy which prevents one customer inadvertently parked at a location inflicting a relatively poor wireless connection quality from streaming a movie at the expense of 11 other customers operating in locations associated with a relatively good wireless connection quality also attempting to stream a movie.

Invoking such a policy is not possible with the current mechanisms for requesting bearer reservations on communication networks. Therefore a need exists for a method and apparatus for admitting requests for allocation of wireless connection resources in a communication system that more fairly allocates wireless connection resources to alleviate the aforementioned issues.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 1 is block diagram of a communication system.

Figure 3:
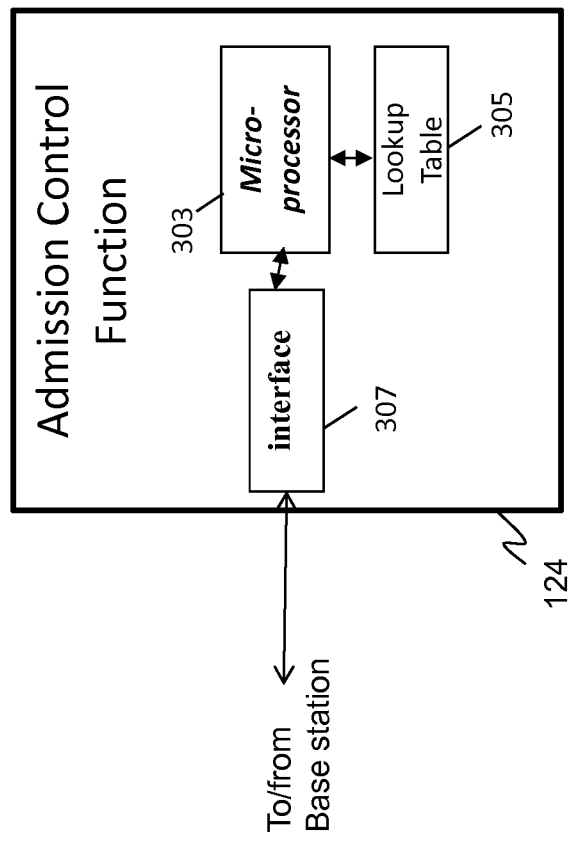
FIG. 3 is a block diagram of an admission control function within the communication system of FIG. 1.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for admitting requests for allocation of wireless connection resources in a communication system is provided herein. During operation, an application executing on the UE or on an application server, respectively, requests a bearer reservation for transmission of a data stream of a given bit rate across the communication system via an admission control function. Bearer reservations, as discussed herein, are inclusive of reservations for bearers supporting unicast, multicast, and broadcast modes of transmission. As part of the bearer request, a bit rate is specified, as well as an identifier of the UE which will transmit or receive the data stream. In response to the bearer reservation request, an admission control function determines an amount of wireless connection resources required to sustain transmission of the requested bit rate given the current wireless connection quality associated with the identified UE. A wireless connection efficiency is then calculated as a function of the requested bit rate and the amount of wireless connection resources required to sustain that bit rate. The calculated wireless connection efficiency is then used to determine whether or not to admit the bearer reservation request in accordance with the teachings described herein.

According to one embodiment, a wireless connection efficiency may be determined for the requested bearer reservation by calculating the ratio of the requested bit rate to the estimated wireless connection resources required to sustain that bit rate given the current wireless connection quality associated with the identified UE. Similarly, for each existing bearer reservation, a wireless connection efficiency may be determined by calculating the ratio of the measured bit rate to the measured wireless connection resources currently required to sustain that bit rate.

If the wireless connection efficiency of the requested bearer reservation is determined to exhibit a specified level of efficiency gain with respect to the wireless connection efficiency of one or more of the existing bearer reservations, and preempting one or more of the existing bearer reservations would free up enough wireless connection resources to admit the requested bearer reservation, the appropriate existing bearers are preempted and the requested bearer reservation is admitted. Notably, in certain circumstances, it may be advantageous to preempt more than one existing bearer reservation in favor of admitting a single requested bearer reservation. For example, multicast and broadcast bearers inherently make more efficient use of wireless connection resources given their ability to deliver a single data stream to multiple UEs using a single set of wireless connection resources. As such, it may be advantageous to preempt multiple existing unicast bearer reservations in favor of admitting a request for a single multicast bearer reservation.

The technique described above will prevent a UE associated with a relatively poor wireless connection quality from unknowingly consuming an exorbitant amount of wireless connection resources while conducting routine (non-emergency) data transfers, thus blocking some number of other UEs associated with a relatively good wireless connection quality from also conducting routine data transfers.

Turing now to the drawings, wherein like numerals designate like components, FIG. 1 shows a block diagram of a communication system 100 in accordance with an illustrative embodiment. Communication system 100 is depicted in a generalized manner. For example, system 100 is illustrated as comprising a single infrastructure communication device 106 (e.g., a BS), three wireless communication devices 102, 104, and 108 (e.g., UEs), an admission control function 124, and fixed application servers 122 for ease of illustration. However, the teachings herein can be implemented in a system having additional infrastructure communication devices, wireless communication devices, admission control functions, and/or fixed application servers.

Each infrastructure communication device and wireless communication device is at least equipped with a transceiver (i.e., transmitter and receiver apparatus) 116, a memory 118, and a processing device 120, and is further equipped with any additional components as needed for a practical embodiment. The transceivers, memories, and processing devices can have any suitable physical implementation and are topologically coupled depending on the particular device implementation. These components are further operatively coupled and can be adapted, arranged, configured, and designed to perform methods in accordance with the teachings herein, for example, as illustratively described by reference to the remaining figures. Transceivers, memories, and processing devices are at least configured for applications (computer readable instructions) to exist on memory that are executed by processing devices which support admittance of bearers and allocation of wireless connection resources between an infrastructure communication device 106 and wireless communication devices 102, 104, and 108.

As referred to herein, a wireless communication device includes, but is not limited to, devices commonly referred to as access terminals, mobile radios, mobile stations, subscriber units, user equipment (UE), mobile devices, or any other device capable of operating in a wireless environment. Examples of wireless communication devices include, but are not limited to, two-way radios, mobile phones, cellular phones, smart phones, tablets, Personal Digital Assistants (PDAs), mobile data terminals (MDT), laptops and two-way pagers. Applications executing on wireless communication devices 102, 104, and 108 may transfer data with applications executing on other wireless communication devices 102, 104, and 108, or with applications residing on a fixed application server 122. Wireless communication devices 102, 104, and 108 may also request bearer reservations from admission control function 124.

As used herein, an infrastructure communication device 106 is a device that is a part of a fixed network infrastructure and can receive information (either control or media, e.g., data, voice (audio), video, etc.) via wireless signals from one or more wireless communication devices and transmit information via wireless signals to one or more wireless communication devices via a wireless connection. An infrastructure communication device includes, but is not limited to, equipment commonly referred to as repeaters, base radios, base stations (BS), evolved Node Bs (eNB), base transceiver stations, access points, or any other type of infrastructure equipment interfacing with one or more wireless communication devices. The infrastructure communication device schedules and proxies transmissions of data streams between wireless communication devices and/or fixed application server 122.

System 100 also includes an admission control function 124 which interfaces with an infrastructure communication device 106, wireless communication devices 102, 104, and 108, and a fixed application server 122. The admission control function receives bearer reservation requests from applications residing on either a fixed application server or on wireless communication devices. The admission control function processes such requests and may admit, deny, preempt, and revoke bearers as appropriate. In some network implementations, such as the 3GPP LTE standard, the functionality of the admission control function, as described herein, may be distributed across the Mobility Management Entity (MME), the Broadcast Multicast Service Center (BM-SC), the Policy and Charging Rules Function (PCRF), or an eNB. In other embodiments, the functionality of the admission control function may be distributed between various shown and omitted system elements, inclusive of the infrastructure communication device 106. Those skilled in the art will also appreciate that any number of intermediate processing entities (not shown) may exist between admission control function 124 and the entities to which it interfaces.

Fixed application server 122 (e.g., a video server) transmits and receives data streams to and from applications executing on wireless communication devices via the infrastructure communication device. Fixed application server 122 also requests bearer reservations from the admission control function.

In this illustrative embodiment, system 100 is a broadband wireless data system, and the infrastructure communication device 106 and the wireless communication devices 102, 104, and 108 communicate in accordance with any standard or proprietary wireless communication protocol that allows for communication of data, including, but not limited to, IEEE 802.11, IEEE 802.16, Long Term Evolution (LTE), Universal Mobile Telecommunication System (UMTS), Evolved-Data Optimized (EVDO), or other communication network technologies employing adaptive modulation techniques. The infrastructure communication device 106 is hereinafter referred to as a base station (BS), and wireless communication devices 102, 104, and 108 are hereinafter referred to as user equipment (UE). In accordance with the LTE standard, the BS is typically referred to as an enhanced Node B (eNB).

A typical communication session comprises transmission of data streams from the BS to the UEs (downlink) and from the UEs to the BS (uplink). The UEs in system 100 communicate with the BS via wireless connections. A wireless connection, as used herein, is a wireless communication channel between 1 BS and at least 1 UE, comprising an allocation of wireless connection resources in the downlink, uplink, or both directions, and can be initiated by either a BS or a UE. The wireless connections comprise allocations of radio spectrum. An allocation of radio spectrum is shared between one or more operating UEs by partitioning it using multiple access techniques well known in the art. Examples of such techniques include Code Division Multiple Access (CDMA), Time Division Multiple Access (TDMA), Orthogonal Frequency Division Multiplexing (OFDM), and variants thereof.

Figure 2:
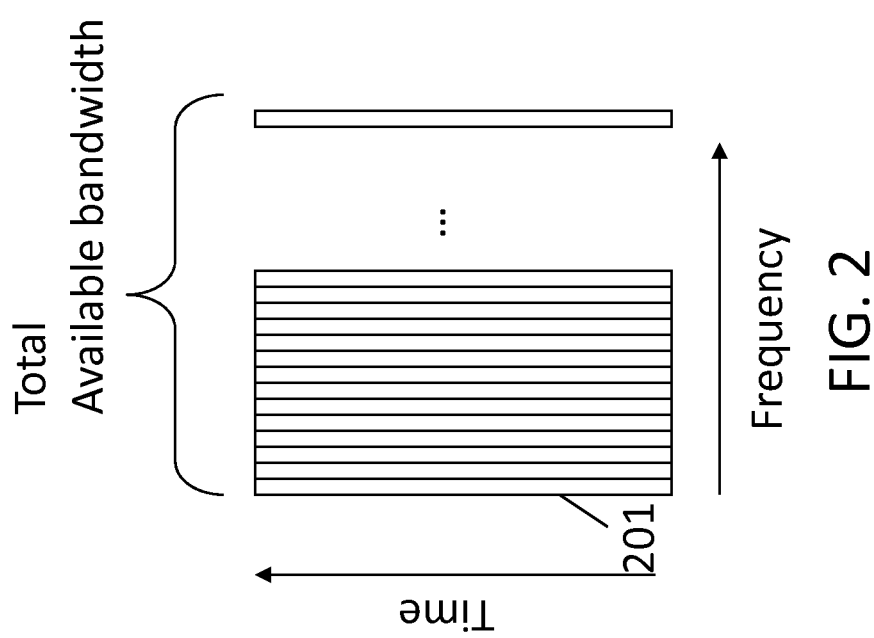
FIG. 2 illustrates wireless connection resources in an OFDM-based communication system.

For illustrative purposes, wireless connection resources are explained here in the context of a 3GPP LTE system. It is understood, however, that communication system 100 and more generally the teachings of this invention need not be limited to the technologies embodied by the LTE standard. As one of ordinary skill in the art will recognize, LTE utilizes OFDM-based multiple access techniques. As shown in FIG. 2, OFDM partitions radio spectrum into a plurality of radio frequency (RF) subcarriers with each RF subcarrier further partitioned into time-based sub-frames. In the context of LTE, a wireless connection resource, as used herein, is an allocation of a subcarrier for a given sub-frame (i.e., a resource block). During operation of an OFDM-based system, one or more subcarriers are assigned or scheduled to transmit a given data stream over a certain number of sub-frames. Each base station has a finite amount of wireless connection resources (i.e., resource blocks), limited by the amount of allocated radio spectrum, which it may allocate to bearer reservations for data transmission.

Communication system 100 also utilizes Adaptive Modulation and Coding (AMC) techniques. AMC is supported by the 3GPP LTE standard, in addition to other broadband wireless data technologies. With AMC, the modulation format and forward error correction (FEC) applied to a transmitted data stream destined for a particular receiving device is selected to predominantly match a current wireless connection quality (at the receiver) for the particular sub-frame being transmitted. The modulation and forward error correction may change on a sub-frame-by-sub-frame basis in order to track the wireless channel quality variations that occur in a mobile communication system. In general, higher complexity modulation formats (e.g., 64 QAM) coupled with reduced forward error correction (e.g., ¼ rate) consume a relatively lesser amount of wireless connection resources for a given bit rate. Conversely, lower complexity modulation formats (e.g., QPSK) and increased forward error correction (e.g., ¾ rate) consume a relatively greater amount of wireless connection resources for the same bit rate. UEs associated with a relatively good wireless connection quality typically utilize higher complexity modulation formats and/or reduced forward error correction. As such, a UE associated with a relatively good wireless connection quality requires far fewer wireless connection resources to transmit or receive a data stream of a given bit rate with respect to a UE associated with a relatively poor wireless connection quality.

As such, in situations where a bearer reservation exists between a UE and a BS, and the associated wireless connection quality is relatively poor, the modulation and forward error correction required to sustain the requested bit rate may result in an inordinate amount of wireless connection resources (i.e., a large portion of the available wireless connection resources) being allocated to one UE with respect to other UEs connected to the same BS sector. This in turn may prevent other UEs associated with a relatively good wireless connection quality and connected to the same BS sector from being able to allocate bearers and effectively communicate.

In order to address the aforementioned issue, a modified admission control function 124 is provided herein. In addition to the other considerations known in the art, the admission control function 124 also takes into account the wireless connection efficiency of the requested bearer reservation with respect to existing bearer reservations.

There exist only a finite number of wireless connection resources available for bearer reservations for data transmission to or from UEs in a given sector of base station 106. Efficient use of these shared wireless connection resources is taken into consideration by calculating the wireless connection efficiency of the requested bearer reservation. In one embodiment, this may be calculated as the ratio of the requested bit rate to the amount of wireless connection resources required to sustain that bit rate given the current wireless connection quality associated with the identified UE. More particularly, the wireless connection efficiency of a data stream transmission may be calculated as the ratio of $$\frac{BitRate}{Resources}.$$

Thus, as the bit rate of a data stream increases for a given amount of wireless connection resources, the data stream transmission is deemed to be more efficient. Likewise, as the amount of wireless connection resources consumed increases for a given bit rate, the data stream transmission is deemed to be less efficient. Those skilled in the art will appreciate that the above ratio may also be inverted or otherwise manipulated in a mathematical fashion which preserves a relationship between bit rate and wireless connection resources. Dependent on the wireless connection technology employed, wireless connection resources may comprise an amount of bandwidth required to sustain transmission of a data stream at a given bit rate in MHz, an amount of resource blocks required to sustain transmission of a data stream at a given bit rate, or any other measure that accurately reflects an amount of wireless connection resources required to sustain transmission of a data stream at a given bit rate.

In accordance with this embodiment, to calculate the wireless connection efficiency, admission control function 124 must be aware of the amount of wireless connection resources required to sustain a given bit rate to a given UE. One technique to determine the amount of wireless connection resources required is to use a wireless connection quality along with a bit rate to lookup an amount of wireless connection resources. Wireless connection quality may be measured as the signal-to-noise ratio (SNR) as determined by the receiver (i.e., a BS or UE) of a wireless signal. As used herein, the term SNR may refer to the SNR as determined by either a BS or a UE. In other embodiments, wireless connection quality may also be derived from a measured Bit Error Rate (BER), Block Error Rate (BLER), and the like. In LTE networks, SNR information is typically known only to the base station 106 and the UEs 102, 104, and 108. In one embodiment, base station 106 records a current inbound and outbound SNR for each connected UE. Such information may be made available to admission control function 124 from base station 106 and/or the UE via a standard or proprietary management interface. Although not required, in order to provide a practical SNR estimate, UEs should be in relatively static SNR conditions. This is due to the direct relationship between the SNR of a UE and the amount of wireless connection resources required to sustain a given bit rate; if a UE's SNR is changing above a predetermined threshold (e.g., −/+6 dB every 5 seconds), it becomes impractical to accurately estimate a corresponding amount of wireless connection resources required to sustain a given bit rate.

To facilitate estimation of a UE's SNR, admission control function 124 should maintain a hysteresis of inbound and outbound SNR for a given UE, and in some embodiments mark entries as either 'static' or 'dynamic' dependent upon the rate of change in SNR. In one embodiment, admission control function 124 may use an average recorded SNR to lookup an amount of wireless connection resources a given bit rate will require from pre-computed tables associated with the selected networking standard (e.g., 3GPP LTE).

Using another technique, admission control function 124 may determine the amount of wireless connection resources required to sustain a given bit rate for a given SNR from measurement of previous or existing bearer reservations associated with the same or similar bit rate and SNR attributes. Alternatively, certain types of bearers may be associated with a static modulation and coding scheme (MCS) whereby modulation format and forward error correction are not adaptive to wireless connection quality. In such instances, the amount of wireless connection resources required to sustain transmission of a given bit rate may be derived from a pre-calculated table mapping bit rate to wireless connection resources for a given bearer type (e.g., multicast), irrespective of wireless connection quality. Such a policy may be invoked for broadcast and multicast bearers where a lowest complexity modulation and highest forward error correction is assumed to increase the probability of reception by a larger number of receivers with differing wireless signal qualities. A static MCS may also be assumed for unicast bearers in instances where associated wireless connection quality information is not readily available for a given UE. In instances where a static MCS is used, wireless connection efficiency is otherwise calculated in a similar manner:

In an alternate embodiment, the wireless connection efficiency of a bearer reservation may instead be derived from previous calculations of wireless connection efficiencies. More particularly, the wireless connection efficiency of a bearer reservation may be estimated from the wireless connection efficiencies of previous or existing bearer reservations associated with the same or similar bit rate and SNR attributes.

Notably, the above teachings regarding determination of wireless connection efficiency are applicable to determining the wireless connection efficiency of both requested bearer reservations and existing bearer reservations.

On modern wireless networks, bearer reservation requests may indicate whether or not the reservation request may preempt an existing bearer reservation already assigned wireless connection resources, in addition to whether or not the requested bearer reservation is itself preempt-able. These flags are typically part of the ARP parameter set. In one embodiment of the present invention, the definition of existing ARP flags are extended to implicitly signal Resource Overutilization Preempt-able (ROP) behavior. In another embodiment, a new flag may be added to ARP to explicitly signal Resource Overutilization Preempt-able (ROP) behavior. When an existing bearer reservation is flagged as being Resource Overutilization Preempt-able, the admission control function is allowed to subsequently preempt that bearer reservation in the event a requested bearer reservation specifying the same priority could make more efficient use of the allocated wireless connection resources. ROP may be explicitly signaled from the requesting application as part of its bearer reservation request, or it may be implicitly derived by the admission control function based on a policy table indexed by standard ARP or priority request parameters associated with the bearer reservation request. Bearer reservation requests with parameters typical of a video stream transmission, for example, may automatically be associated with an enabled ROP value.

Requests for bearer reservations may include an optional priority, typically signaled as part of an ARP parameter set. Requests not specifying an explicit priority may be assigned a default priority per a configured policy. In accordance with the present invention, when the admission control function processes a bearer reservation request, it begins by following the standard priority-based preemption behavior dictated by the communication system. Typically, if there are not sufficient wireless connection resources to admit a requested bearer reservation, and there are existing bearer reservations for the same point-of-attachment associated with a lower priority, said existing bearer reservations will be preempted as necessary. If, after following the standard behavior, the requested bearer reservation would otherwise still be rejected (i.e., even after priority preemption, sufficient wireless connection resources do not exist to admit the requested bearer reservation), the following steps are executed by admission control function 124.

1. Estimate the amount of wireless connection resources required by the requested bearer reservation by converting the requested bit rate (requestedBitRate) to an amount of wireless connection resources (requestedResources) required to sustain that bit rate given the wireless connection quality of the UE identified in the bearer reservation request.

2. Determine the wireless connection efficiency of the requested bearer reservation (requestedEfficiency). In one embodiment, requestedEfficiency is calculated by taking the ratio of requestedBitRate to requestedResources.

3. Determine a set of all existing bearer reservations of the same priority, at the same point-of-attachment, and in the same link direction (i.e., inbound or outbound) as the requested bearer reservation.

3. For each existing bearer reservation identified in Step 3, determine the amount of wireless connection resources consumed by the existing bearer reservation by converting the bit rate associated with the reservation (existingBitRate) to an amount of wireless connection resources (existingResources) consumed by the reservation.

4. Determine the wireless connection efficiency of each existing bearer reservation (existingEfficiency). In one embodiment, existingEfficiency is calculated by taking the ratio of existingBitRate to existingResources.

5. For each existing bearer reservation identified in Step 3, execute a function to determine if the wireless connection efficiency (calculated in Step 2) of the requested bearer reservation exhibits a required efficiency gain (where required efficiency gain is dictated by a configured policy) with respect to the wireless connection efficiency of each existing bearer reservation (calculated in Step 4). If the requested bearer reservation exhibits the required efficiency gain over the existing bearer reservation, mark the existing bearer reservation as a candidate for preemption.

6. From the set of existing bearer reservations marked in Step 5, determine if, for any given existing bearer reservation, requestedResources<=existingResources. If true, preempt the existing bearer reservation, admit the requested bearer reservation, and discontinue further processing.

In an alternate embodiment, Step 6 is augmented such that if requestedResources<=existingResources does not evaluate to true for any existing bearer reservation, a running summation of ΣexistingResources is tallied over the set of existing bearer reservations marked in Step 4 until requestedResources<=ΣexistingResources. If and when requestedResources<=ΣexistingResources, the existing bearer reservations which contributed to ΣexistingResources are preempted, the requested bearer reservation is admitted, and further processing is discontinued.

In either embodiment, if the requested bearer reservation is not otherwise admitted, it is rejected and further processing is discontinued.

In the above example, the wireless connection efficiency of existing bearer reservations was calculated only when a bearer reservation request is processed. Alternatively, the wireless connection efficiency of existing bearer reservations may be periodically recalculated asynchronous to the receipt of bearer reservation requests.

With regard to Step 5, there exist multiple embodiments of a policy to determine if a requested bearer reservation makes more efficient use of wireless connection resources with respect to an existing bearer reservation. In one embodiment, for each existing bearer reservation, it is determined:

$$\text{if} \left( \left( \left( \frac{requestedBitRate}{requestedResources} \right) * efficiencyGain \right) > \left( \frac{existingBitRate}{existingResources} \right) \right) \quad (1)$$

where efficiencyGain is a configured spectral efficiency gain required before an existing bearer reservation is subject to preemption.

Other criteria may be used in conjunction with (1) to further assist in determining whether or not to preempt an existing bearer reservation in favor of admitting a requested bearer reservation. For example, multicast and broadcast bearers may be favored (e.g., efficiencyGain may be configured to be greater than 1.0) over unicast bearers.

Those skilled in the art will appreciate that certain of the above steps may be reordered (e.g., Step 3) while still producing the same result.

FIG. 3 is a block diagram showing admission control function 124. As shown, admission control function 124 comprises logic circuitry 303 (microprocessor 303), an interface 307, and a lookup table 305. Logic circuitry 303 preferably comprises a microprocessor controller, such as, but not limited to, a digital signal processor (DSP), general purpose central processing unit (CPU), a programmable logic device (PLD), or application specific integrated circuit (ASIC) and is utilized to process bearer reservation requests in accordance with the invention disclosed herein. The admission control function 124 uses interface 307 to communicate with base stations 106 and applications running on both fixed application server 122 and UEs 102, 104, and 108. As previously noted, the functionality of the admission control function may be embodied in an infrastructure processing device such as a PCRF, or in a base station 106, or divided between two or more such entities.

Figure 4:
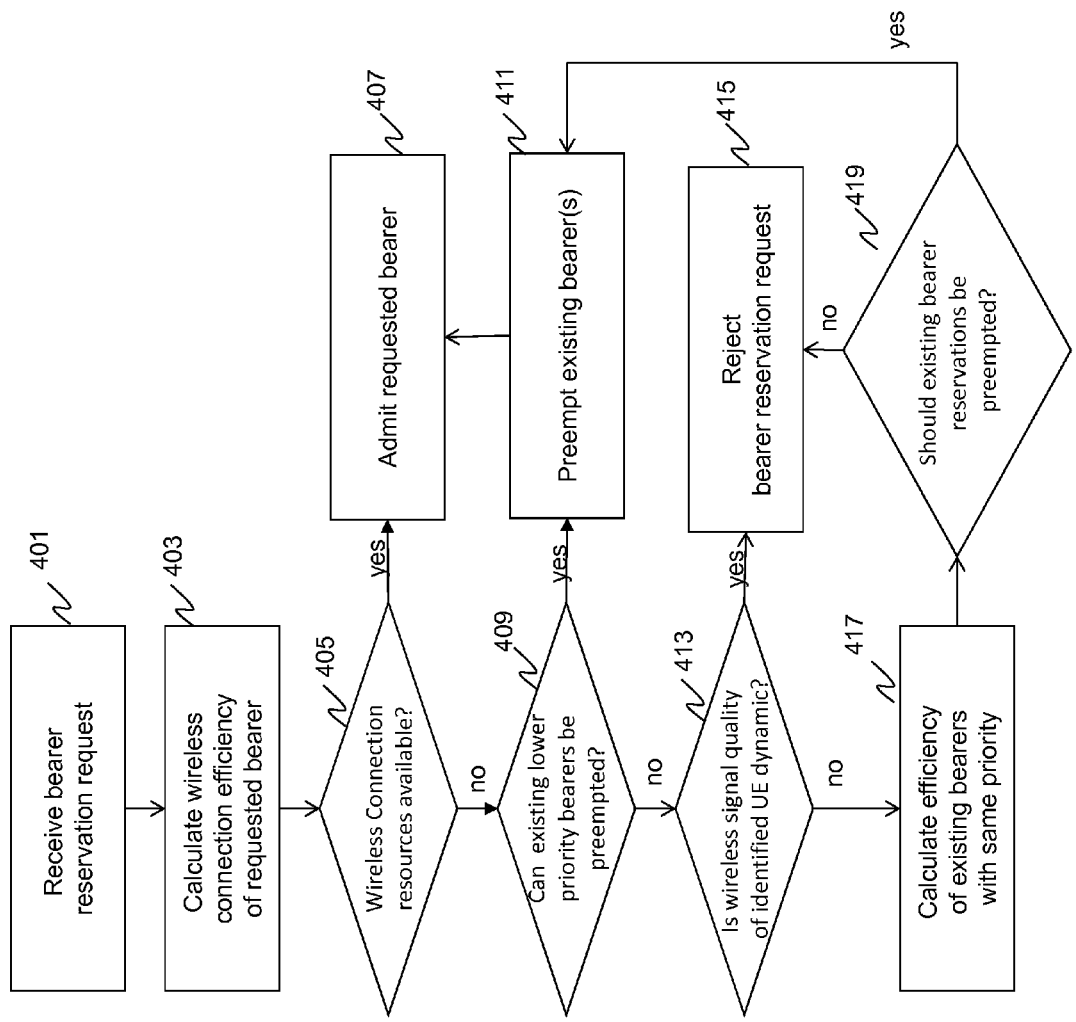
FIG. 4 is a flow chart showing operation of the admission control function of FIG. 3.

FIG. 4 is a flow chart showing operation of admission control function 124. More particularly, the flow chart of FIG. 4 shows the operation of admission control function 124 when admitting a request for allocation of wireless connection resources in a communication system.

The logic flow begins at step 401 where interface 307 receives a bearer reservation request from an application executing on either a UE 102, 104, 108 or a fixed application server 122. As discussed previously, the bearer reservation request comprises a request for an allocation of an amount of wireless connection resources, wherein the request comprises a bit rate. The bearer reservation request may also have an associated priority.

At step 403 logic circuitry 303 calculates the wireless connection efficiency of the bearer reservation request. As previously noted, a wireless connection efficiency for the requested bearer reservation may be calculated as the ratio of the requested bit rate to the estimated wireless connection resources required to sustain that bit rate given the current wireless connection quality associated with the identified UE. Thus, wireless connection efficiency is a function of a bit rate and an amount of wireless connection resources. The step of determining the wireless connection efficiency of the requested bearer reservation comprises the steps of determining an amount of wireless connection resources required to sustain the bit rate received with the request for the bearer reservation and determining the wireless connection efficiency of the requested bearer reservation as a ratio of the bit rate within the request to the amount of wireless connection resources required to sustain the bit rate received with the request. The step of determining the amount of wireless connection resources required to sustain the bit rate received with the request for the bearer reservation comprises the steps of determining a wireless connection quality between a wireless communication device and an infrastructure communication device and determining, based on the wireless connection quality, an amount of wireless connection resources required to sustain the bit rate received with the request for the bearer reservation. As discussed above, the step of determining the wireless connection efficiency of the requested bearer reservation may comprise the step of determining the wireless connection efficiency based on historical values of the wireless connection efficiency of the existing bearer reservations.

Thus, logic circuitry may first determine a wireless connection quality of a wireless connection existing between a UE and a BS. The wireless connection resources required to sustain the requested bit rate may be inferred from the determined wireless connection quality by accessing lookup table 305. Lookup table 305 may be preconfigured with information relating wireless connection quality to wireless connection resources consumed for a particular bit rate.

If wireless connection resources are available (step 405), logic circuitry 303 admits the requested bearer reservation at the requested bit rate (step 407). If, however, wireless connection resources are not available, logic circuitry 303 determines if one or more existing lower priority bearer reservations can be preempted to satisfy the bearer reservation request (step 409).

If, at step 409, one or more lower priority bearer reservations can be preempted to satisfy the bearer reservation request, then the lower priority bearers are preempted (step 411) and the logic flow continues to step 407 where the requested bearer reservation is admitted.

If, at step 409, it is determined that lower priority bearer reservations cannot be preempted to fulfill the bearer reservation request, then the logic flow continues to optional step 413 where logic circuitry 303 determines if the UE identified in the bearer reservation request is experiencing high fluctuations (highly dynamic) in wireless connection quality. Thus, if the system is configured to check for a relatively static wireless connection quality of the identified UE, optional step 413 may reject (step 415) the bearer reservation request if the wireless connection quality is not relatively static.

If the bearer reservation request is not otherwise rejected, the logic circuitry then calculates the wireless connection efficiency of existing bearer reservations associated with the same priority as the bearer reservation request (step 417). As discussed previously, a wireless connection efficiency may be calculated for each existing bearer reservation as the ratio of the requested or measured bit rate to the measured or estimated wireless connection resources required to sustain that bit rate. The wireless connection resources consumed by existing bearer reservations may be directly measured via a query to the BS supporting the identified UE, or they may be inferred from a measured wireless connection quality by accessing lookup table 305. Each existing bearer reservation is associated with a bit rate and an amount of wireless connection resources. The step of determining the wireless connection efficiency of existing bearer reservations comprises the steps of determining a wireless connection quality for each existing bearer reservation, determining, based on the wireless connection quality for each existing bearer reservation, an amount of wireless connection resources required to sustain the bit rate associated with the existing bearer reservation, and determining the wireless connection efficiency of each existing bearer reservation as a ratio of the bit rate associated with the existing bearer reservation to the amount of wireless connection resources required to sustain the bit rate associated with the existing bearer reservation.

The logic flow continues to step 419 where logic circuitry 303 uses the calculated wireless connection efficiency of the bearer reservation request and the calculated wireless connection efficiencies of existing bearer reservations to identify existing bearers which make less efficient use of wireless connection resources. More particularly, logic circuitry 303 compares the wireless connection efficiency of the requested bearer reservation to the wireless connection efficiency of existing bearer reservations to determine a set of existing bearer reservations which make less efficient use of wireless connection resources. Logic circuitry 303 then determines a subset of existing bearer reservations to be preempted, based on a policy which considers wireless connection efficiency. In one embodiment, the step of determining, based on the policy, the subset of existing bearer reservations to be preempted comprises the step of determining only the existing bearer reservations having a same priority as the priority associated with the request for the bearer reservation.

If existing bearers should be preempted, the logic flow continues to step 411 where the appropriate existing bearers are preempted and the bearer reservation request is admitted (step 407). This may comprise preempting one or more existing bearer reservations. If, however, it is determined that no existing bearer reservations should be preempted, the logic flow continues to step 415 where the bearer reservation request is rejected.

As discussed above, bearer reservation requests should preempt existing bearer reservation(s) if the request is more efficient (e.g., by determination of equation 1), and sufficient resources would be freed such that the requested bearer reservation can be admitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for admitting a request for allocation of wireless connection resources, the method comprising the steps of:
receiving, via an interface, a request for a bearer reservation for an allocation of an amount of wireless connection resources, wherein the request comprises a bit rate;
determining a wireless connection efficiency of the requested bearer reservation;
determining a wireless connection efficiency of existing bearer reservations, wherein each existing bearer reservation is associated with a bit rate and an amount of wireless connection resources;
comparing the wireless connection efficiency of the requested bearer reservation to the wireless connection efficiency of existing bearer reservations to determine a set of existing bearer reservations which make less efficient use of wireless connection resources than the requested bearer reservation;
determining, based on a policy, a subset of the existing bearer reservations to be preempted that make less efficient use of wireless connection resources than the requested bearer reservation;
preempting the subset of existing bearer reservations with less efficient use of the wireless connection resources than the bearer request;
admitting the requested bearer reservation;
wherein wireless connection efficiency is a function of a bit rate and an amount of wireless connection resources;
wherein the policy comprises preempting an existing bearer reservation $$\text{if} \left( \left( \left( \frac{requestedBitRate}{requestedResources} \right) * efficiencyGain \right) > \left( \frac{existingBitRate}{existingResources} \right) \right),$$

wherein:
requestedBitRate comprises the bit rate within the request for the bearer reservation;
requestedResources comprises an amount of wireless connection resources required to sustain requestedBitRate;
efficiencyGain comprises a required spectral efficiency gain before an existing bearer reservation is subject to preemption;
existingBitRate comprises the bit rate associated with an existing bearer reservation; and
existingResources comprises an amount of wireless connection resources required to sustain existingBitRate.

2. The method of claim 1 wherein the step of determining the wireless connection efficiency of the requested bearer reservation comprises the steps of:
determining an amount of wireless connection resources required to sustain the bit rate received with the request for the bearer reservation; and
determining the wireless connection efficiency of the requested bearer reservation as a ratio of the bit rate within the request to the amount of wireless connection resources required to sustain the bit rate received with the request.

3. The method of claim 2 wherein the step of determining the amount of wireless connection resources required to sustain the bit rate received with the request for the bearer reservation comprises the steps of:
determining a wireless connection quality between a wireless communication device and an infrastructure communication device; and
determining, based on the wireless connection quality, an amount of wireless connection resources required to sustain the bit rate received with the request for the bearer reservation.

4. The method of claim 1 wherein the step of determining the wireless connection efficiency of existing bearer reservations comprises the steps of:
determining an amount of wireless connection resources required to sustain the bit rate associated with the existing bearer reservation; and
determining the wireless connection efficiency of the existing bearer reservations as a ratio of the bit rate associated with the existing bearer reservation to the amount of wireless connection resources required to sustain the bit rate associated with the existing bearer reservation.

5. The method of claim 4 wherein the step of determining the amount of wireless connection resources required to sustain the bit rate associated with the existing bearer reservation comprises the steps of:
determining a wireless connection quality for each existing bearer reservation;
determining, based on the wireless connection quality for each existing bearer reservation, an amount of wireless connection resources required to sustain the bit rate associated with the existing bearer reservation.

6. The method of claim 1 wherein the request for the bearer reservation is associated with a priority and each existing bearer reservation is also associated with a priority.

7. The method of claim 6 wherein the step of determining, based on the policy, the subset of existing bearer reservations to be preempted comprises the step of determining only the existing bearer reservations having a same priority as the priority associated with the request for the bearer reservation.

8. The method of claim 1 further comprising the steps of:
determining a wireless connection quality between a wireless communication device and an infrastructure communication device;
determining if the wireless connection quality is relatively static; and
rejecting the request for the bearer reservation if the wireless connection quality is not static.

9. The method of claim 1 wherein the step of determining the wireless connection efficiency of the requested bearer reservation comprises the step of determining the wireless connection efficiency based on historical values of the wireless connection efficiency of the existing bearer reservations.

10. The method of claim 1 wherein the policy comprises favoring a request for a multicast or broadcast bearer reservation over an existing unicast bearer reservation.

11. An apparatus comprising:
an interface receiving a request for a bearer reservation for an allocation of an amount of wireless connection resources, wherein the request comprises a bit rate;
logic circuitry determining a wireless connection efficiency of existing bearer reservations, wherein each existing bearer reservation is associated with a bit rate and an amount of wireless connection resources, the logic circuitry comparing the wireless connection efficiency of the requested bearer reservation to the wireless connection efficiency of existing bearer reservations to determine a set of existing bearer reservations which make less efficient use of wireless connection resources than the requested bearer reservation, the logic circuitry determining, based on a policy, a subset of existing bearer reservations making less efficient use of wireless connection resources to be preempted, and preempting the subset of existing bearer reservations making less efficient use of the wireless connection resources than the bearer request, and admitting the requested bearer reservation; and
wherein wireless connection efficiency is a function of a bit rate and an amount of wireless connection resources;
wherein the policy comprises preempting an existing bearer reservation $$\text{if} \left( \left( \left( \frac{requestedBitRate}{requestedResources} \right) * efficiencyGain \right) > \left( \frac{existingBitRate}{existingResources} \right) \right),$$

wherein:
requestedBitRate comprises the bit rate within the request for the bearer reservation;
requestedResources comprises an amount of wireless connection resources required to sustain requestedBitRate;
efficiencyGain comprises a required spectral efficiency gain before an existing bearer reservation is subject to preemption;
existingBitRate comprises the bit rate associated with an existing bearer reservation; and
existingResources comprises an amount of wireless connection resources required to sustain existingBitRate.

12. The apparatus of claim 11 wherein the logic circuitry determines the wireless connection efficiency of the requested bearer reservation by determining an amount of wireless connection resources required to sustain the bit rate received with the request for the bearer reservation, and determining the wireless connection efficiency of the requested bearer reservation as a ratio of the bit rate within the request to the amount of wireless connection resources required to sustain the bit rate received with the request.

13. The apparatus of claim 12 wherein the logic circuitry determines the amount of wireless connection resources required to sustain the bit rate received with the request for the bearer reservation by determining a wireless connection quality between a wireless communication device and an infrastructure communication device, and determining, based on the wireless connection quality, an amount of wireless connection resources required to sustain the bit rate received with the request for the bearer reservation.

14. The apparatus of claim 11 wherein the logic circuitry determines the wireless connection efficiency of existing bearer reservations by determining, an amount of wireless connection resources required to sustain the bit rate associated with the existing bearer reservation, and determining the wireless connection efficiency of the existing bearer reservations as a ratio of the bit rate associated with the existing bearer reservation to the amount of wireless connection resources required to sustain the bit rate associated with the existing bearer reservation.

15. The apparatus of claim 14 wherein the logic circuitry determines the amount of wireless connection resources required to sustain the bit rate associated with the existing bearer reservation by determining a wireless connection quality for each existing bearer reservation, and determining, based on the wireless connection quality for each existing bearer reservation, an amount of wireless connection resources required to sustain the bit rate associated with the existing bearer reservation.

16. The apparatus of claim 11 wherein the request for the bearer reservation is associated with a priority and each existing bearer reservation is also associated with a priority.

17. The apparatus of claim 16 wherein the logic circuitry determines, based on the policy, by determining only the existing bearer reservations for preemption having a same priority as the priority associated with the request for the bearer reservation.

18. The apparatus of claim 11 wherein the logic circuitry additionally determines a wireless connection quality between a wireless communication device and an infrastructure communication device, if the wireless connection quality is relatively static, and rejects the request for the bearer reservation if the wireless connection quality is not static.

* * * * *